P. RISSMANN.
AUTOMATIC STUFFING MACHINE.
APPLICATION FILED JUNE 29, 1921.

1,431,257.

Patented Oct. 10, 1922.
9 SHEETS—SHEET 1.

INVENTOR.
BY Paul Rissmann
Stuart C Barnes
ATTORNEY.

INVENTOR.
Paul Rissmann
BY
Stuart C Barnes
ATTORNEY.

Patented Oct. 10, 1922.

1,431,257

UNITED STATES PATENT OFFICE.

PAUL RISSMANN, OF DETROIT, MICHIGAN, ASSIGNOR TO FISHER BODY CORPORATION, OF DETROIT, MICHIGAN, A CORPORATION OF NEW YORK.

AUTOMATIC STUFFING MACHINE.

Application filed June 29, 1921. Serial No. 481,362.

*To all whom it may concern:*

Be it known that I, PAUL RISSMANN, a citizen of the United States, residing at Detroit, in the county of Wayne and State of Michigan, have invented certain new and useful Improvements in Automatic Stuffing Machines, of which the following is a specification.

This invention relates to automatic stuffing machines, more particularly a machine for automatically stuffing French plaits or straight pipes. Heretofore it has been customary to manufacture the upholstering for automobiles by sewing the top trimming material to the burlap or other heavy material backing in straight lines of stitches, forming what is technically known as French plaits or straight pipes. These are also now used with upholstering that has a leather facing or imitation leather facing. These have almost entirely supplanted the former type of upholstering by tufting. They are cheaper to manufacture, easier to keep clean and to many have an improved appearance over the old tufting.

In manufacturing these straight pipes or French plaits it has been customary to stitch the trimming or facing material to the burlap by folding the same and stitching the fold to the back. This forms straight pipes which now are stuffed by hand. Ordinarily a pair of channel strips of metal are used, a strip of cotton wadding is laid in the smaller width channel strip, the larger width channel strip is then laid over this, and the two squeezed together and inserted in the straight pipe. The operator then releases the pressure that holds the plaits together and withdraws them in a separated condition, leaving the stuffing or cotton wadding in the pipe.

It is the object of the present invention to do this work by a machine that is almost entirely automatic.

In the drawings,—

Fig. 18 is a section on the line 18—18 of Fig. 17.

The frame-work on which the active machine parts are supported will be plain enough from the several side and end elevations and sections. It is simply suitable pipe and needs no detailed explanation.

Figures 9, 10, 11:
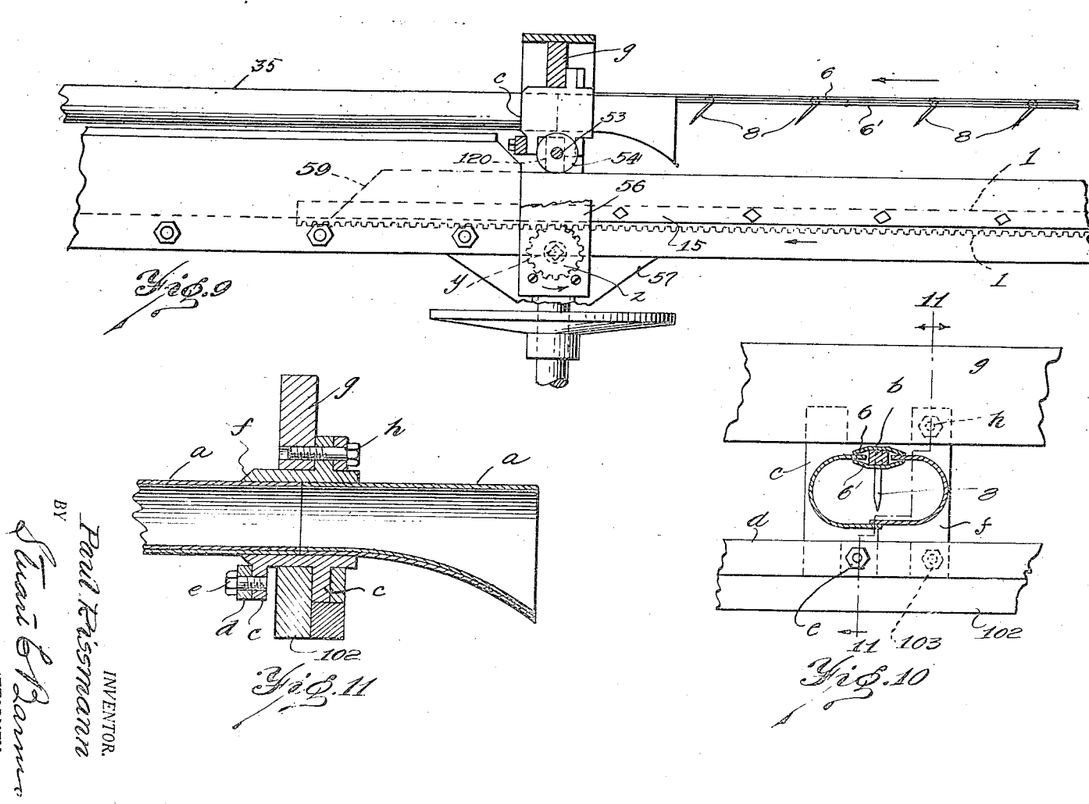
Fig. 9 is an enlarged side elevation of the upper portion of the machine near the center.
Fig. 10 is a section through one of the collapsible pipe cores.
Fig. 11 is a section on the line 11—11 of Fig. 10.

Supported on this frame-work are a plurality of hollow pipe cores $a$, here shown to be thirteen in number but obviously variable to suit conditions. After these cores have been stuffed in a way to be described, the trimming material is fitted over this set of hollow pipe cores, each French plait or straight pipe being fitted over one of these cores. This has to be done by hand. However, in order to make the operation a facile one it is possible to collapse these cores within given limits. It will be seen that each core is made up of a pair of half cores or U channels, one of which is slightly less in width than the other. Consequently they can be pushed together within the possibilities afforded by the spacing shown in Fig. 10. When the trimming material has been fitted over them of course the feeding bar $b$, shown in Fig. 10, is not located in the position there shown for it has been withdrawn from the core. This collapsing of the core is possible by reason of supporting one of the channels in a fixture $c$. This fixture (detailed in Figs. 24 and 25) is secured to the shifting rod $d$ by the cap screw $e$. The other, the smaller width U channel, is supported in a fixture $f$ (detailed in Figs. 26 and 27) which is at the top secured to the fixed bar $g$ by the screw $h$ (Figs. 10 and 11). The bottom of the fixture $f$ is secured to the fixed bar 102 by the bolt 103. The movable fixture $c$ has its two downwardly-projecting lugs straddling the bar 102 and hence slidably guided thereon. Hence by shifting the bar $d$ (see Fig. 2) by means of the lever $j$, it is possible to open and close the pipe cores. Obviously these cores can only be supported at one end for the trimming has to be fitted over the opposite end and consequently they have to be free at the opposite end. The operator collapses the pipes when the trimming is fitted over them and after the trimming has been fitted over them they are opened out again.

Figure 16:
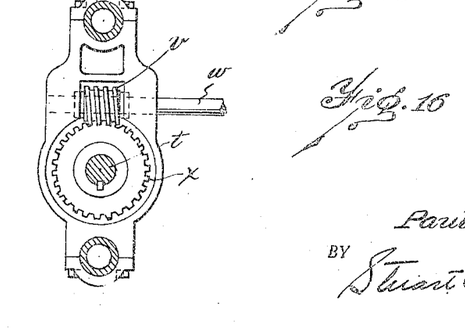
Fig. 16 is a section taken on the line 16—16 of Fig. 4.
Figures 19, 20, 21, 22, 23:
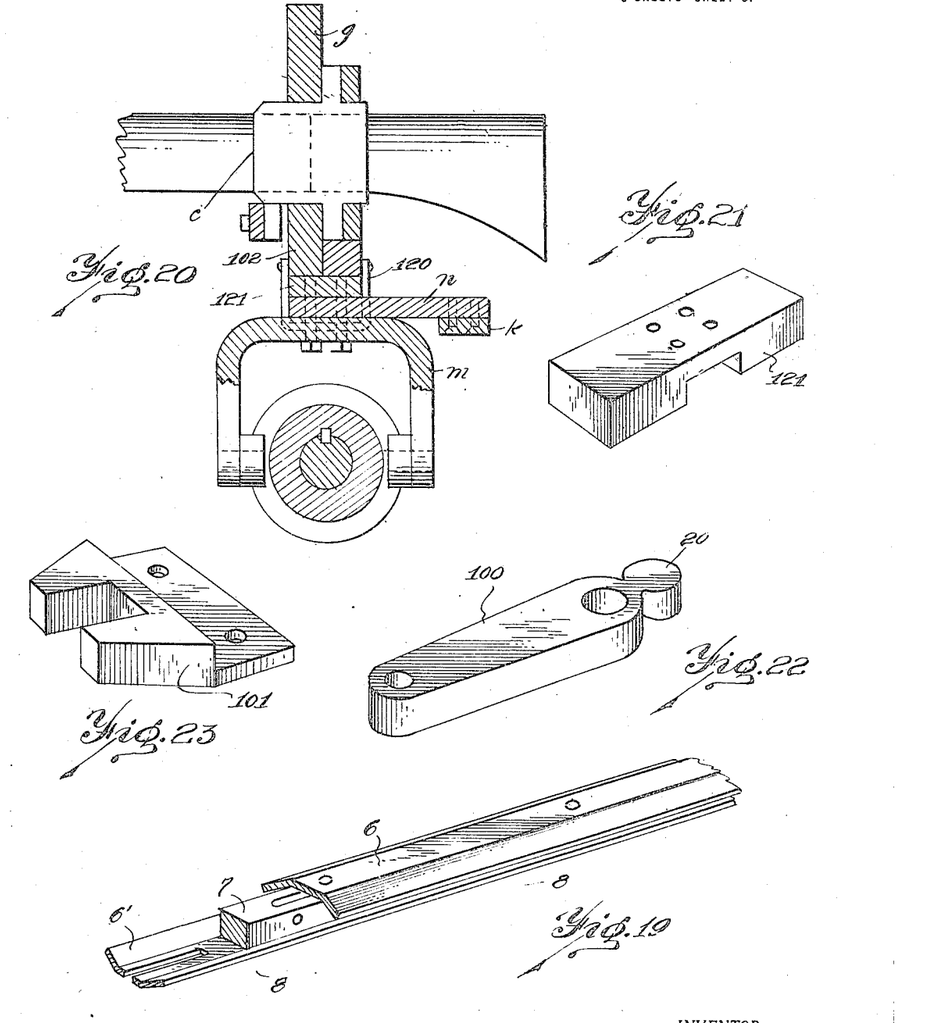
Fig. 19 is a detail in perspective of one of the feeding bars.
Fig. 20 is a cross section through the clutch fork, showing in elevation the supports for the collapsible cores.
Fig. 21 is a perspective of one of the bars used in the clutch-shifting fork mechanism.
Fig. 22 is a perspective of the rock arm shown at 100 in Figs. 17 and 18.
Fig. 23 is a perspective of the block 101 shown in Figs. 17 and 18.

In stuffing the cores, the machine is started by using the lever $i$ (Fig. 2) to shift the clutch rod $k$. This connects with the clutch-shifting fork $m$ through the bar $n$ (Fig. 20). This throws the clutch part $o$ into engagement with the clutch part $p$, giving forward movement. The clutch parts $p$ and $r$ are connected to friction wheels $p'$ and $r'$ that run on opposite sides of the friction disk $q$ on the end of the drive shaft $t$ which is pressed up against the friction wheels by the coiled spring $u$. This drive shaft $t$ is keyed to the worm gear $x$ (Fig. 16) which engages with the worm $v$ on the motor shaft $w$.

Figure 1:
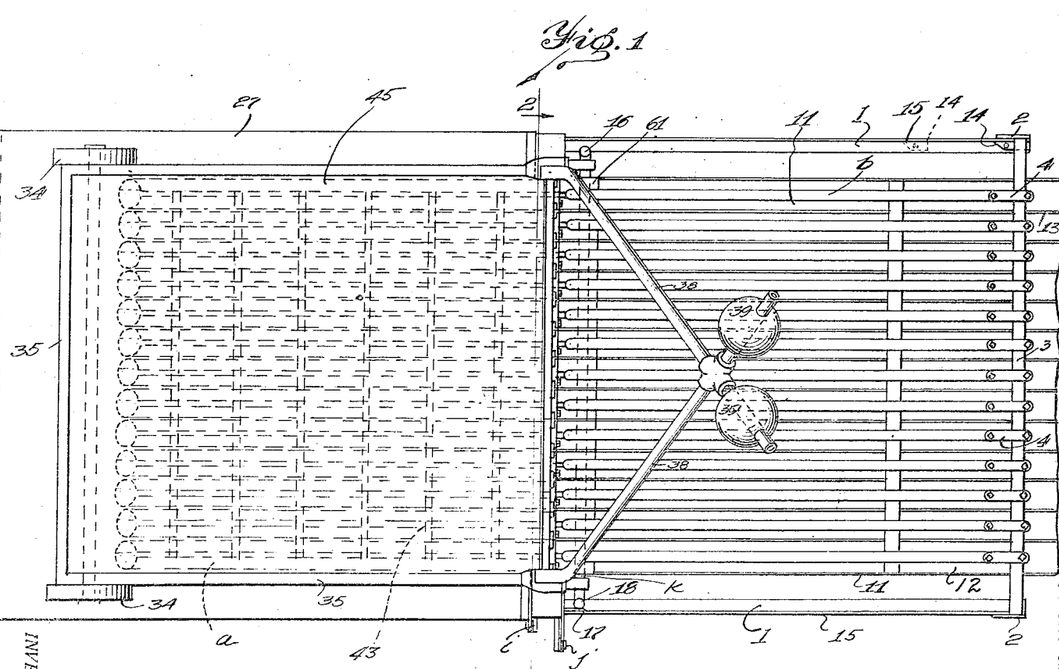
Fig. 1 is a plan view of the machine.
Figure 2:
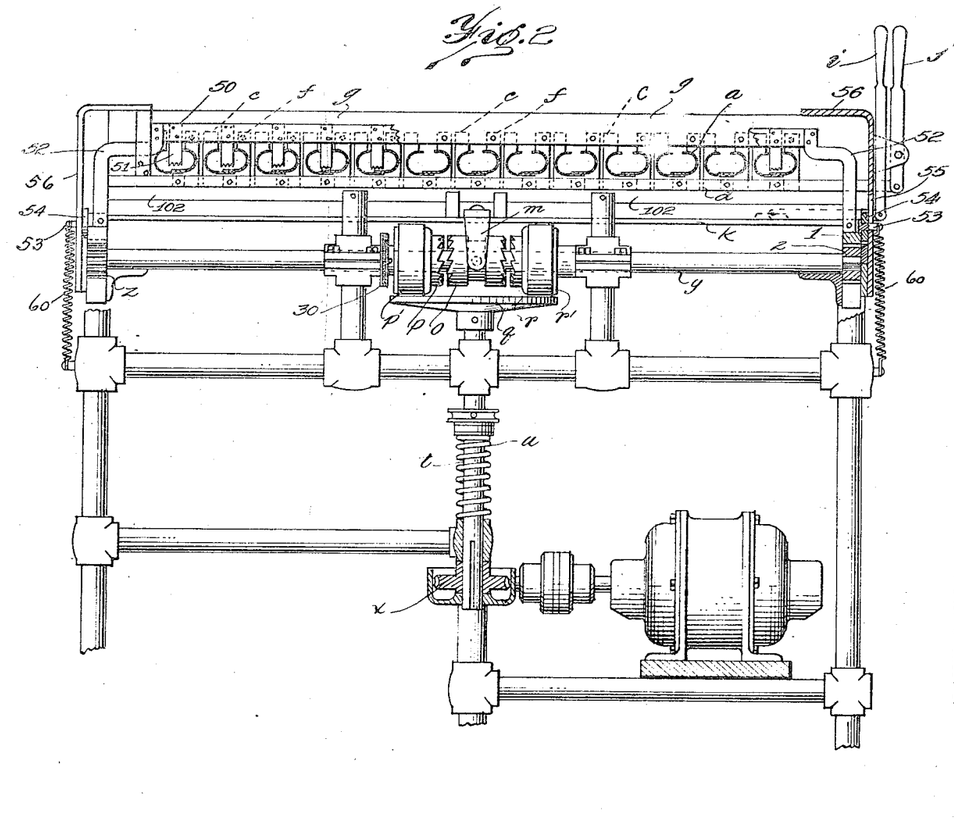
Fig. 2 is a cross section of the same taken on the line 2—2 of Fig. 1.
Figure 12:
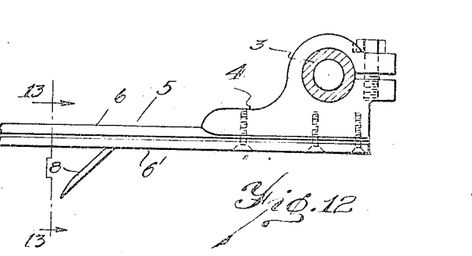
Fig. 12 is a side elevational detail of the supported end of one of the feeding bars.
Figure 13:
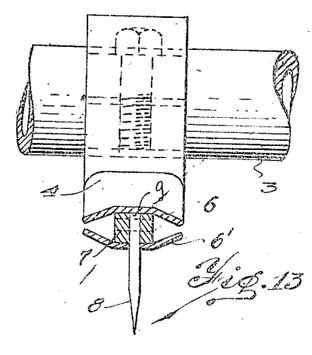
Fig. 13 is a section on the line 13—13 of Fig. 12.

Now referring to Fig. 2, it will be seen that on the end of the cross shaft $y$ are pinions $z$ adapted to mesh with the racks 1 (see Fig. 9). This rack connects with the brackets 2 at the front end of the machine. These brackets carry a cross rod 3 (see Fig. 3 and Fig. 1). To this cross rod 3 is secured a plurality of clamps 4 (detailed in Fig. 12), thirteen in number, each of which is secured to the feeding bar $b$. These feeding bars are detailed in Figs. 12, 13, 14, 15 and 19. Each feeding bar is made up of a pair of flaring shallow channel strips 6 and 6' between which is clamped a steel block 7 provided with suitable cut-away portions to receive and pivot the feeding pins 8. These feeding pins have heads 9 which engage the top channel strip 6 so that they can never drop down below the position shown in full lines in Fig. 14. However, they may be drawn up into the long recesses 10 in the steel block 7 so as to clear the wadding and be withdrawn from the hollow cores.

Figure 14:
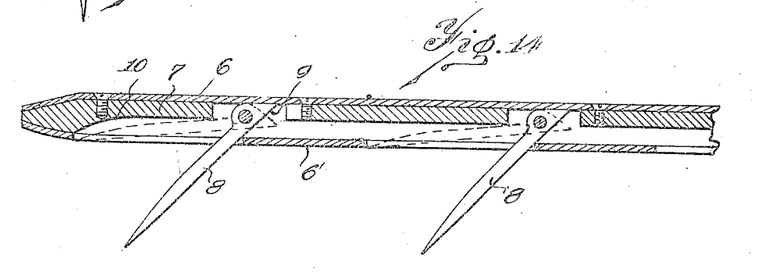
Fig. 14 is a longitudinal section of the free end of one of the feeding bars.
Figure 15:
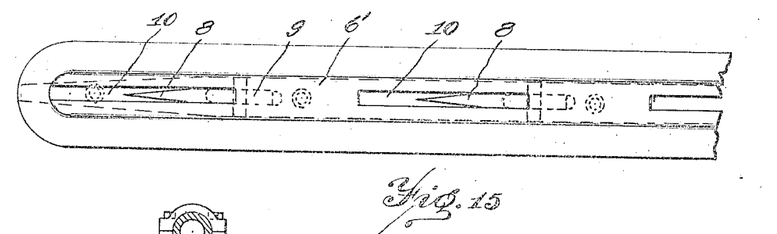
Fig. 15 is a plan view of the bottom of the feed bar.

Now obviously when the driving mechanism is started by shifting the clutch away from the operator, this will start the pinions $z$ rotating and cause the rack 1 to travel toward the rear of the machine carrying the feeding bars $b$ with the feeding pins and dropped down into the position shown in Fig. 14. These engage a strip of cotton wadding that is carried up in the troughs 11. Each of these troughs 11 is connected with a partitioned wadding bin 12 constructed of sheet metal. The partitions 13 are shown in the plan view, Fig. 1. This strip of cotton wadding when struck by the projecting pins 8 is carried into the core, the feeding bar riding partly over the core and partly in the core, as shown in Fig. 10. The upper channel strip 6 rides on the outside of the core while the lower channel strip 6' rides on the inside of the core and the pins 8 engage down into the interior of the core, thereby carrying the wadding into the core.

When the bar 3 has advanced sufficiently to the rear to bring a strip of wadding the complete length of the trimming material or the pipes, the cam 14 (Figs. 1 and 17) on the rack bar 1 engages the end 16 of the clutch-shifting rod $k$ and throws the clutch to the opposite side. The cam 14 can be adjusted along its support to vary the travel of the feeding bars and accommodate this to trimming of varying width. This throws the clutch fork $m$ to the right (as viewed in Fig. 2), bringing the driven clutch part into engagement with the driving clutch part $r$, thereby reversing the movement of the rack 1. This causes the feeding bars $b$ to be withdrawn from the collapsible cores $a$, the fingers 8 withdrawing up into the feeding bars as shown by the dotted lines (Fig. 14). When the feeding bars have traveled back to their original position the cam 17 engages the end 18 of the clutch-shifting rod $k$ (Fig. 1) and thereby shifts the clutch fork $m$ back to neutral position, disengaging the clutch parts. It will be seen that the cam 17 is less than half the width of the cam 14. Hence when the cam 17 engages the rod it only disengages the clutch parts.

Figures 16, 17:
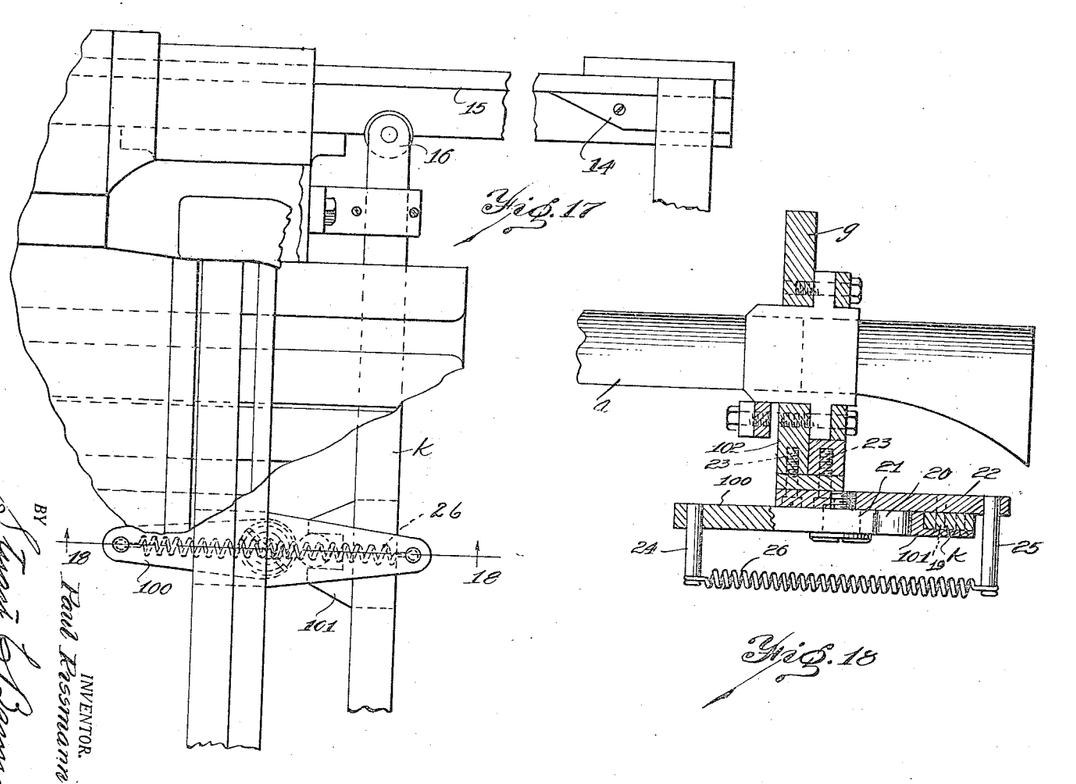
Fig 17 is a detail plan view showing the automatic clutch-shifting mechanism and the means for holding it to a given position of shift.

Now turning to Figs. 17 and 18, it will be seen that the clutch-shifting rod k is secured by screws 19 to the block 101. This block 101 (detailed in Fig. 23) engages a head 20 of the arm 100. This arm is detailed in Fig. 22. This arm 100 is pivoted on the pin 21 which is secured to the fixed arm 22 that is secured to the fixed bar 102 by means of screws 23. This pivoted arm 100 carries a depending pin 24 while the fixed arm 22 carries a depending pin 25. The coiled spring 26 engages between the two pins 24 and 25 and is at its maximum extension when the two arms are in line. Hence when the pivoted arm 100 is thrown to either side of a straight line position with respect to the fixed arm 22, this spring tends to keep the pivoted arm in that position. This is a familiar device for holding a pivoted member to either side of the center position. It is used in this machine for the purpose of holding the clutch parts together either in reverse or forward, and also for the purpose of assisting in getting a quick snappy action when either the clutch parts are thrown into engagement by hand or by the cam 14. The cam 17 engaging with the end 18 of the clutch-shifting rod k holds the parts in neutral position. This cam 17 can be thin enough so as to cause the clutch parts to disengage but not assume an accurately center position as this would put the spring 26 into action if it were shifted by its center position. So long as the driven clutch part does not reach the center position then this spring 26 tends to hold the clutch parts disengaged in connection with the cam 17. The U brackets 120 secured to the bar 102 guide the block 121 and limit the throw of the member n.

Figures 3, 26, 27:
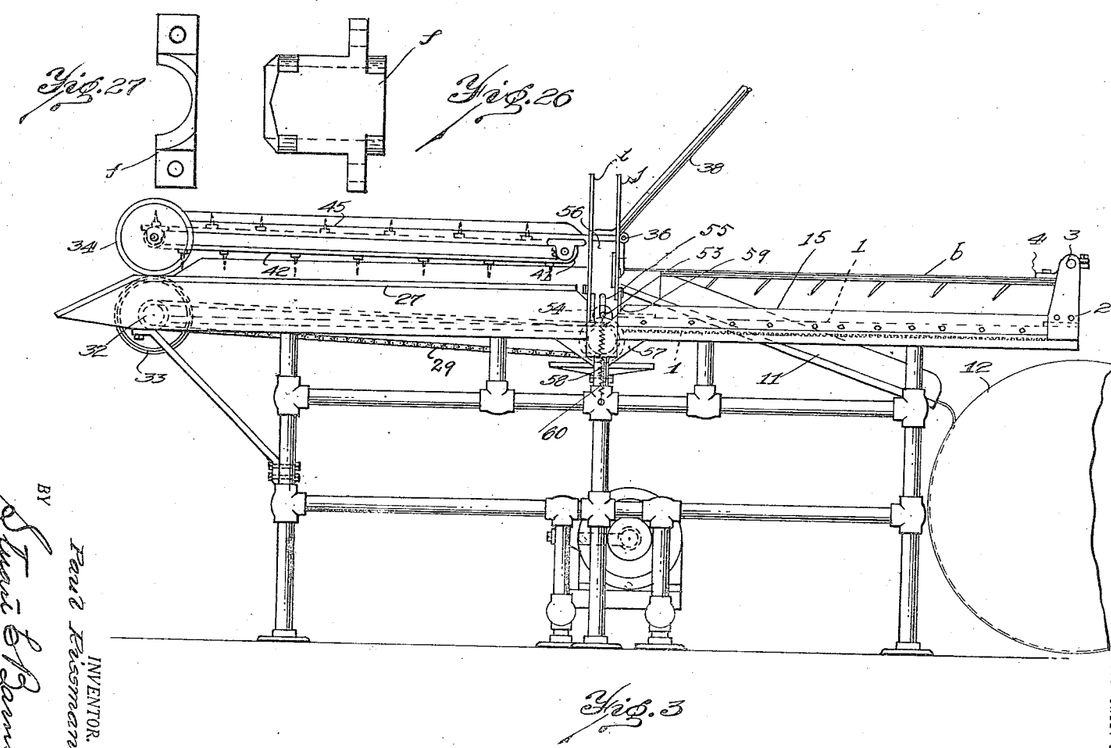
Fig. 3 is a side elevation of the machine.
Figs. 24, 25, 26 and 27 are details of the collapsible core supports.
Figures 4, 24, 25:
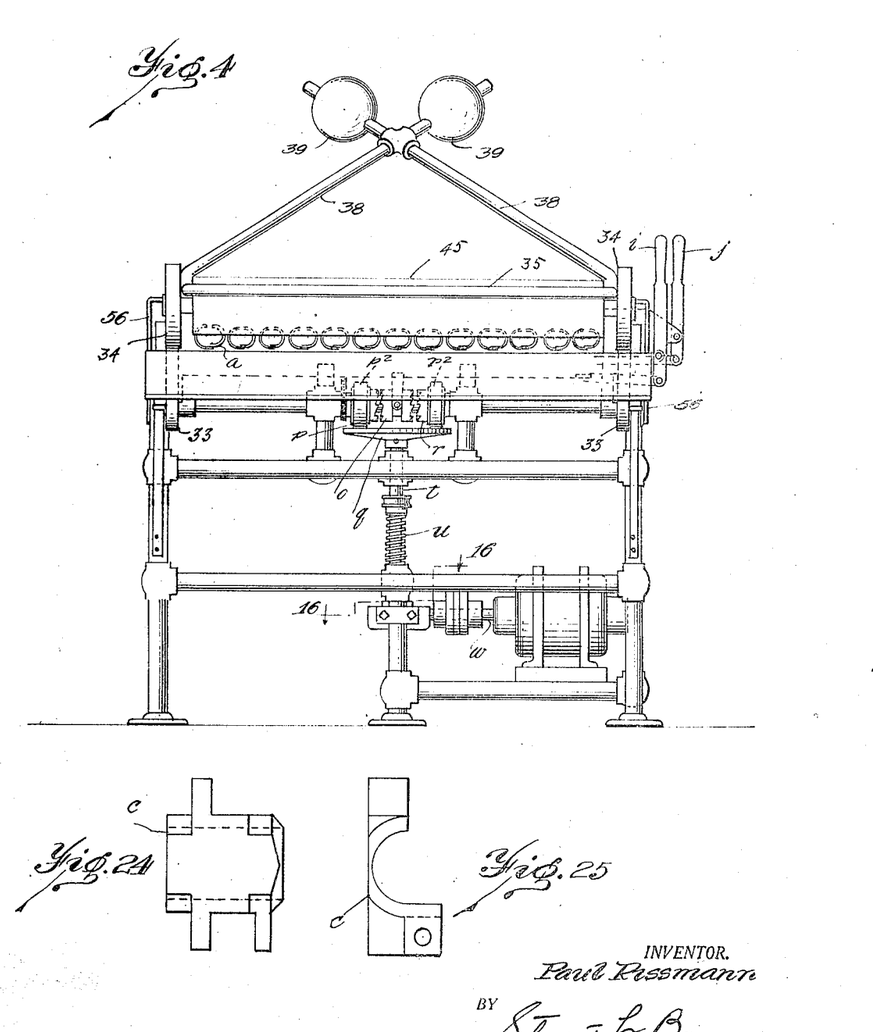
Fig. 4 is an end elevation taken from the left hand end of Fig. 1.
Figures 5, 6, 7, 8:
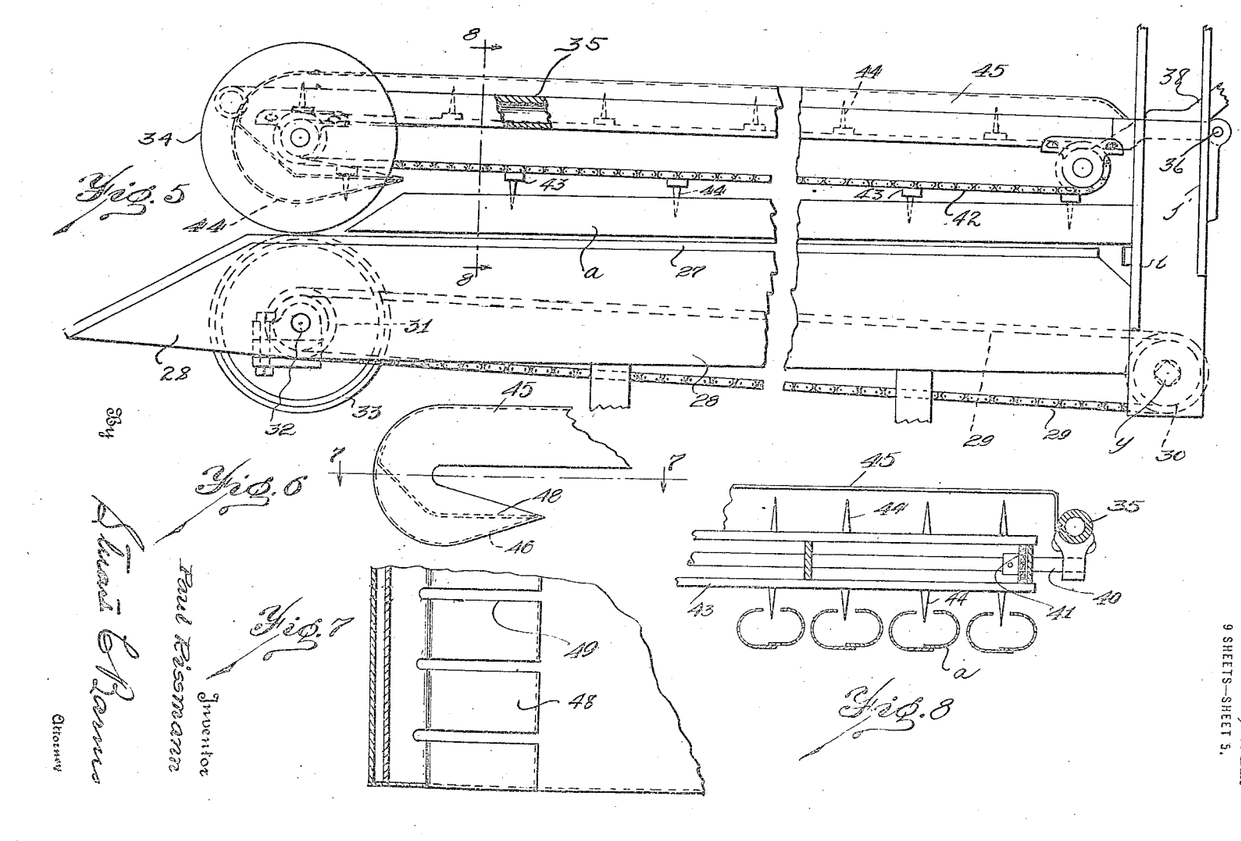
Fig. 5 is an enlarged side elevation of the upper rear portion of the machine.
Figs. 6 and 7 are details of the parts which cause the pins that eject the work to clear themselves from the work when their function is ended, Fig. 7 being a section on the line 7—7 of Fig. 6.
Fig. 8 is a section on the line 8—8 of Fig. 5.

Referring to Fig. 5, the details of the work ejecting mechanism will be understood. 27 designates a table preferably constructed of maple board which has depending flanges 28 that extend down at the sides and serve as guards. The driving chain 29 runs over a sprocket 30 supported on the shaft y near the center of the machine (Fig. 2) and over a sprocket wheel 31 on the shaft 32. This shaft has a pair of friction wheels 33 on the end which protrude through the wooden table 27 and are adapted to be engaged by the friction wheels 34 carried on the frame 35 which is hinged at 36 to the upright post (Fig. 3). This frame is counterbalanced by the lever arms 38 (Fig. 1) provided with the weights 39. This frame 35 (see Fig. 8) rotatably supports a shaft 40 which is provided with two pairs of sprocket wheels 41 over which the chains 42 (Fig. 3) passes. This chain is provided with a plurality of slats 43 fastened thereto, which slats carry the pins 44. A sheet metal guard 45 is located over these slats and pins and has a formation at the rear end such as shown in Figs. 6 and 7. The top sheet extends down in hook-like form to form the bottom wall 46 of the device that serves to clear the pins 44 from the work. This element will be broadly referred to in the claims as means for clearing the pins or the ejecting mechanism from the work. Another sheet of metal 48 is riveted to the inside of the turned-over top sheet 46. These two sheets 48 and 46 meet at an acute angle and are slotted as at 49 to allow the pins 44 to pass through these slots in drawing out of the work as the pins start to turn by reason of the chain turning on the sprocket wheel at this point. These slotted sheets of metal 48 and 46 serve as a sort of prow to cut between the work and the pins and allow the pins to clear themselves of the work as they turn over the sprocket wheel. This is obviously an important feature in the success of the ejecting mechanism for it assures the ejecting mechanism always ridding itself of the work.

Ordinarily the ejecting mechanism is held up out of the way of the collapsible cores. The feeding bars feed the wadding into the cores, the cores are collapsed, the trimming material fitted over the cores, and then the pivoted frame-work which carries the ejecting pins is dropped down onto the table. The friction wheels on the frame engage the friction wheels on the table and consequently start the pins to traveling, thereby forcing the trimming material suitably packed with the wadding off from the cores. The pins engage the trimming material at a great number of points evenly distributed over its entire surface, and when the frame carrying the ejecting pins is dropped onto the trimming material, all these pins are impaled in the trimming material and stuffing and consequently each exercises an equal pull in pulling off the trimming material.

Referring now to Fig. 2, it will be seen that there is a bar 50 that has a plurality of toothed blades or pinchers 51 projecting down therefrom, one for each collapsible pipe core. This bar 50 is bent into arms 52 at opposite ends which have their lower ends supported by studs 53 on which is rotatably supported the roller 54. These studs 53 engage through the slots 55 in the plates 56. These plates 56 are secured to the triangular gusset 57 which is supported on the stud 58 of the pipe frame-work. Now referring to Figs. 3 and 9, it will be seen that this roller 54 is adapted to be dropped down when the rack 1 resumes its forward position. The roller drops down the incline 59 on the rear end of the bar 15, the coiled spring 60 pulling the same down the incline, and consequently as soon as the feeding bars $b$ return to their initial position the pinchers 51 are dropped down through the slots in the collapsible cores and thereby pinch the strip of wadding to the bottom of the core and hence as soon as the ejecting pins begin their work the strip of wadding is torn in two and consequently these blades and the actuating connections constitute an automatic mechanism for separating the strip from its source of supply when the ejecting mechanism comes into play.

The machine may be operated by the placing of the trimming first on the cores and then causing the feeding bars to advance upon the cores and trimming. In some cases it will be more advantageous to use one method of operation and in some cases the other method of operation. I desire it understood that the claims comprehend both methods of operation although perhaps in some the language used is more descriptive of one form of operation than the other.

What I claim is:

1. In a machine for the purpose specified, the combination of a plurality of stationary hollow cores shaped to fill out the straight pipes of the trimming material to be stuffed and over which the said trimming material may be fitted and withdrawn with the stuffing and means for simultaneously filling said cores with stuffing material.

2. In a machine for the purpose specified, the combination of a plurality of stationary hollow cores shaped to fill out the straight pipes of the trimming material to be stuffed and over which the said trimming material may be fitted and withdrawn, means for filling said cores with stuffing material, and means for ejecting the trimming material together with the stuffing taken from the cores.

3. In a machine for the purpose specified, the combination of a plurality of collapsible cores, the cores being supported at one end to permit the trimming material to be fitted over them when they are collapsed and provided with openings to permit the stuffing material to be dragged out of the cores with the withdrawal of the trimming material therefrom, and means for stuffing the cores.

4. In a machine for the purpose specified, the combination of a plurality of collapsible cores, means for filling the cores with stuffing material, the members being arranged so that the trimming material with straight pipes may be fitted over the collapsed cores, and means for ejecting the trimming material with the stuffing taken from the cores.

5. In a machine for the purpose specified, the combination of a plurality of cores over which the trimming material with straight pipes can be fitted, the said cores adapted to be filled with stuffing material, and means for ejecting the trimming material when stuffed from the cores, comprising a plurality of traveling pins adapted to be impaled in the trimming and stuffing and movable along the cores to draw the trimming material and the stuffing therefrom.

6. In a machine for the purpose specified, the combination of a plurality of cores having slots in their tops, said cores adapted to contain a stuffing material and the straight pipes of the trimming material fitted over them, and means for ejecting the trimming material with the stuffing, comprising a frame provided with a plurality of traveling pins which frame can be dropped onto the trimming material to cause the pins to be impaled in the trimming material and stuffing and then travel along the slots in the cores to eject the trimming material and stuffing therefrom.

7. In a machine for the purpose specified, the combination of a plurality of cores provided with slots in their top, said cores arranged to be filled with stuffing material and adapted to have the straight pipes of the trimming material fitted over them, and means for ejecting the work from the cores, comprising a frame supporting a plurality of slats having pins and traveling on an endless chain, the said frame arranged to be dropped on the trimming material to impale the pins therein and also in the stuffing, the said pins traveling along the slots in the cores and ejecting the trimming material and the stuffing from the cores.

8. In a machine for the purpose specified, the combination of a plurality of cores having slots in the top, said cores arranged to be filled with stuffing material and arranged to have the straight pipes of trimming material fitted over them, one or more friction wheels supported to rotate adjacent the cores, means for rotating said friction wheels, and means for ejecting the work from the cores, comprising a frame supporting a traveling chain, one or more friction wheels for engaging the friction wheel or wheels adjacent the cores giving movement to the chain, and a plurality of slats supported on the chain and having pins adapted to be impaled on the trimming material and stuffing when the frame is let down thereupon, the said pins traveling along the slots in the cores to eject the work from the cores.

9. In a machine for the purpose specified, the combination of a plurality of cores adapted to contain stuffing material and over which straight pipes of trimming material may be fitted, means for ejecting the trimming material with stuffing from the cores, and means for causing the ejecting means to clear the trimming material and stuffing when the ejecting work is being completed.

10. In a machine for the purpose specified, the combination of a plurality of slotted cores adapted to contain stuffing material and over which the straight pipes of trimming material can be fitted, means for ejecting the trimming material and stuffing from the cores including a plurality of pins that engage in the slots of the cores and traveling therealong, and means for causing the pins to free themselves from the trimming material and stuffing as they complete their work.

11. In a machine for the purpose specified, the combination of a plurality of slotted cores adapted to contain stuffing material over which the straight pipes of trimming material may be fitted, means for ejecting the trimming material together with stuffing from the cores including a plurality of pins that travel along the slots in the cores, and means for clearing the pins from the work, comprising a pair of slotted plates meeting at an acute angle and having their slots in alignment with the traveling pins which lift through the slots while the trimming material slides under the plates.

12. In a machine for the purpose specified, the combination of a plurality of collapsible cores arranged side by side and over which the straight pipes of trimming material may be fitted, and means for automatically filling the said cores with stuffing before the same are collapsed.

13. In a machine for the purpose specified, the combination of a plurality of slotted cores over which the straight pipes of trimming material may be fitted, and means for filling the same with stuffing material, comprising a plurality of feeding bars having pins adapted to travel in the slots for carrying the stuffing into the cores.

14. In a machine for the purpose specified the combination of a plurality of cores arranged in substantially the same horizontal plane and adapted to have the straight pipes of trimming material drawn thereover, means for guiding a plurality of continuous strips of stuffing material arranged in substantially the same horizontal plane to the entrance of said cores and rectilinearly traveling means for simultaneously carrying the advanced portions of such continuous strips of stuffing material into the cores.

15. In a machine for the purpose specified, the combination of a plurality of cores over which the straight pipes of trimming material may fit, means for guiding strips of stuffing material to the entrance of the cores, and a plurality of feeding bars having devices for catching the stuffing strips and carrying them into the cores.

16. In a machine for the purpose specified, the combination of a plurality of slotted cores arranged to have the straight pipes of trimming material fitted thereover, means for guiding strips of stuffing to the entrance of the cores, and a plurality of reciprocating feeding bars each having a plurality of pins adapted to be projected in an angular position in a forward movement to carry the stuffing strips into the cores and arranged to withdraw into the feeding bars when the feeding bars are returning.

17. In a machine for the purpose specified, the combination of a plurality of cores, a plurality of reciprocating feeding bars adapted to carry strips of stuffing into the cores and return, rotating means for driving said feeding bars in rectilinear motion including a reversing clutch, and automatic means connected with the feeding bars for operating said clutch to reverse the movement of the feeding bars.

18. In a machine for the purpose specified, the combination of a plurality of cores arranged to have the straight pipes of trimming material fitted thereover, means for carrying stuffing material into the cores including a plurality of feeding bars, rotating means for driving the feeding bars back and forth in rectilinear motion and including a power disengaging and reversing clutch, and means connected with the feeding bars for reversing the power and finally disengaging the power.

19. In a machine for the purpose specified, the combination of a plurality of cores arranged to have the straight pipes of trimming material fitted thereover, means for carrying stuffing material into the cores including a plurality of feeding bars, rotating means for driving the feeding bars in rectilinear motion and including a disengaging and reversing clutch, a clutch-shifting rod, a cam carried on one side of the feeding bars for engaging the clutch-shifting rod to reverse the power, and a cam carried on the side of the feeding bars engaging the rod to disengage the clutch when the feeding bars have traveled back to their initial position.

20. In a machine for the purpose specified, the combination of a plurality of cores arranged to have the straight pipes of trimming material fitted thereover, a partitioned bin for containing a plurality of strips of stuffing material, means for guiding the strips of stuffing material from the individual divisions of the bin to the entrance of the cores, and means for taking hold of the strips and feeding them into the cores.

21. In a machine for the purpose specified, the combination of a plurality of cores comprising each a pair of U channels one of greater width than the other, each U channel supported upon a fixture and each pair of fixtures relatively shiftable to collapse the cores and to cause the wider and narrower core to telescope sidewise to a certain extent.

22. In a machine for the purpose specified, the combination of a pair of collapsible cores comprising each a pair of U channels, a plurality of fixed fixtures, a fixed bar for supporting said fixed fixtures, each of said fixed fixtures supporting at one end one of the U channels of a core, and a plurality of shiftable fixtures supporting the other U channels of the cores, and a shiftable bar on which said shiftable fixtures are supported.

23. In a machine for the purpose specified, the combination of means for stuffing straight pipes of trimming material automatically with continuous strips of stuffing, means for ejecting the trimming material so stuffed, and means co-operating with said ejecting means for separating the strips of stuffing from the unused remainder of the strip.

24. In a machine for the purpose specified, the combination of a plurality of cores over which the straight pipes of trimming material are adapted to be fitted, means for carrying continuous strips of stuffing material thereinto, and automatically set means for severing the strips of stuffing from the unused remainder of the strip when the straight pipes have been filled.

25. In a machine for the purpose specified, the combination of a plurality of cores arranged to have the straight pipes of trimming material fitted thereover, means for carrying continuous strips of stuffing into the cores, means for ejecting the work from the cores, and means co-operating with said ejecting means for separating the strips of stuffing from the unused remainder of the strip.

26. In a machine for the purpose specified, the combination of a plurality of cores, feeding bars for carrying continuous strips of stuffing material into the cores, separating members that may be let down on the stuffing material to pinch the same when the feeding bars have returned to their initial position, and means for ejecting the work from the cores and separating the stuffing strips from the unused remainder of the strips by exercising a draft on them when the same are pinched by the said holding members.

27. In a machine for the purpose specified, the combination of a plurality of cores, a plurality of feeding bars for carrying continuous strips of stuffing material into the cores, a frame member for reciprocating the feeding bars provided at its rear with an inclined surface, a cross bar provided with a plurality of blades, means for yieldingly urging said blades downward and a roller connected with said cross bar and adapted to ride on the frame member and down the inclined surface at the end of the same when the feeding bars have returned to their initial position, thereby causing the blades to drop down onto the strips of stuffing material, and means for ejecting the trimming material and the stuffing material from the cores, thereby separating the stuffing material from the source of supply.

28. In a machine for the purpose specified, the combination of a table, a plurality of slotted cores supported on the table, a frame pivoted with respect to said table and provided with an endless traveling member, supporting pins adapted to engage in the slots of the cores to eject the work from the cores when the frame is swung down to bring the pins into the cores.

29. In a machine for the purpose specified, the combination of a table, one or more driving wheels protruding through the table, a plurality of slotted cores supported over the table, a pivoted frame supported above the table and supporting a traveling chain upon which are supported a plurality of traveling pins, one or more friction wheels supported on the frame for driving the chain and adapted to engage the friction wheel or wheels of the table when the frame is dropped down to bring the pins into the slots in the cores.

30. In a machine for the purpose specified, the combination of a table, a plurality of slotted cores supported above the table, a frame pivotally supported with respect to the cores and the table and carrying a traveling chain provided with a plurality of pins adapted to travel in the slots in the core when the frame is swung down in the cores, and arms and counterweights for counterbalancing the said pivoted frame.

31. In a machine for the purpose specified, the combination of a plurality of cores, reciprocating feeding bars for carrying strips of stuffing into said cores, rotating means for reciprocating said feeding bars including a reversing and disengaging clutch, automatic means for operating said clutch, and a spring thrown by its maximum extension position by said means for the purpose of holding the clutch in either of two given positions.

32. In a machine for the purpose specified, the combination of a plurality of cores, feeding bars for carrying strips of stuffing into the cores and withdrawing from said core, rotary means for driving said feeding bars in reciprocating movement including a reversing clutch, automatic means for reversing the clutch, and a spring device arranged to be thrown by its position of maximum extension when throwing the clutch into forward or reverse positions to insure the said clutch parts holding such positions and assisting in the throwing actions.

33. In a machine for the purpose specified, the combination of a plurality of cores, feeding bars for carrying strips of stuffing material into the cores and retreating, rotary means for driving the feeding bars including a clutch, means for shifting the clutch parts into the forward position, automatic means for shifting the clutch parts to reverse the travel, an arm connected with said automatic means and with the means for placing the clutch parts in the forward position, and a spring engaging with said arm, said arm and spring cooperating to hold the clutch parts in either of their positions by reason of throwing the spring over a position of maximum extension.

In testimony whereof I affix my signature.

PAUL RISSMANN.